US012811238B2

(12) United States Patent
Xiong

(10) Patent No.: US 12,811,238 B2
(45) Date of Patent: Nov. 24, 2026

(54) BRACKET AND CELL CONTACT SYSTEM ASSEMBLY

(71) Applicant: EVE ENERGY CO., LTD., Huizhou (CN)

(72) Inventor: Fengsheng Xiong, Huizhou (CN)

(73) Assignee: EVE ENERGY CO., LTD., Huizhiou (CN)

( * ) Notice: Subject to any disclaimer, the term of this patent is extended or adjusted under 35 U.S.C. 154(b) by 69 days.

(21) Appl. No.: 18/401,602

(22) Filed: Dec. 31, 2023

(65) Prior Publication Data

US 2024/0332718 A1 Oct. 3, 2024

(30) Foreign Application Priority Data

Mar. 30, 2023 (CN) ......................... 202310333811.2
Mar. 30, 2023 (CN) ......................... 202320684431.9

(51) Int. Cl.
*H01M 50/298* (2021.01)
*H01M 50/502* (2021.01)
*H02G 3/04* (2006.01)

(52) U.S. Cl.
CPC ....... *H01M 50/298* (2021.01); *H01M 50/502* (2021.01); *H02G 3/0456* (2013.01)

(58) Field of Classification Search
CPC .......... H02G 3/30; H02G 3/32; H01M 50/298
See application file for complete search history.

(56) References Cited

U.S. PATENT DOCUMENTS 3,659,319 A 5/1972 Erickson
4,023,758 A * 5/1977 Yuda ......................... F16L 3/13 248/74.3

(Continued)

FOREIGN PATENT DOCUMENTS

CN 101305853 A 11/2008
CN 202371309 U 8/2012

(Continued)

OTHER PUBLICATIONS

European Search Report in European application No. 23220677.1, mailed on Jun. 6, 2024.

(Continued)

*Primary Examiner* — Bradley Duckworth
(74) *Attorney, Agent, or Firm* — PV IP PC; Wei Te Chung; Christopher S. Ruprecht

(57) ABSTRACT

The present application provides a bracket and a cell contact system assembly. The bracket includes a bracket body, an elastic member and a position-limiting member. A fixed end of the elastic member and a fixed end of the position-limiting member are assembled on the bracket body. The position-limiting member, the elastic member and the bracket body enclose to define a position-limiting space. An end of the elastic member away from the fixed end of the elastic member is a free end. An end of the position-limiting member away from the fixed end of the position-limiting member is a position-limiting end. A guiding opening defined between the free end of the elastic member and the position-limiting end of the position-limiting member is communicated with the position-limiting space. The guiding opening has a size being adjusted by changing a degree of deformation of the free end of the elastic member.

19 Claims, 4 Drawing Sheets

(56) References Cited

U.S. PATENT DOCUMENTS

| | | | | |
|---|---|---|---|---|
| 5,794,895 | A * | 8/1998 | Besserer | H02G 3/263 248/73 |
| 5,988,570 | A * | 11/1999 | Gretz | H02G 3/32 248/89 |
| 6,427,952 | B2 * | 8/2002 | Caveney | F16L 3/23 248/74.1 |
| D473,449 | S * | 4/2003 | Wu | D8/356 |
| 7,294,789 | B1 | 11/2007 | Watthanasintham | |
| 7,304,861 | B2 * | 12/2007 | Takahashi | H05K 3/301 248/74.3 |
| 8,729,408 | B2 * | 5/2014 | Pawlak | E04F 19/04 248/68.1 |
| 10,212,385 | B2 * | 2/2019 | Ma | H04N 5/64 |
| 10,307,022 | B1 * | 6/2019 | Cole | A47K 10/12 |
| 12,005,225 | B2 * | 6/2024 | Corato | F16B 2/08 |
| 2022/0032863 | A1 | 2/2022 | Shimizu et al. | |
| 2022/0312647 | A1 * | 9/2022 | Harsch | H05K 7/20845 |

FOREIGN PATENT DOCUMENTS

| | | | |
|---|---|---|---|
| CN | 207000172 | U | 2/2018 |
| CN | 210007296 | U | 1/2020 |
| CN | 211046290 | U | 7/2020 |
| CN | 111799721 | A | 10/2020 |
| CN | 217788506 | U | 11/2022 |
| CN | 218771036 | U | 3/2023 |
| CN | 219739801 | U | 9/2023 |
| EP | 1378979 | A1 | 1/2004 |
| JP | 2011100670 | A | 5/2011 |
| JP | 2018026943 | A | 2/2018 |
| WO | 9005400 | A1 | 5/1990 |

OTHER PUBLICATIONS

International Search Report in International application No. PCT/CN2023/092473, mailed on Jun. 23, 2023.

Written Opinion of the International Search Authority in International application No. PCT/CN2023/092473, mailed on Jun. 23, 2023.

Chinese Office Action issued in corresponding Chinese Patent Application No. 202310333811.2 dated Jan. 30, 2026, pp. 1-9.

Chinese Office Action issued in corresponding Chinese Patent Application No. 202310333811.2 dated May 14, 2026, pp. 1-7.

* cited by examiner

BRACKET AND CELL CONTACT SYSTEM ASSEMBLY

CROSS-REFERENCE TO RELATED APPLICATION

This application claims priority to Chinese Patent Application Serial No. 202310333811.2 filed to China National Intellectual Property Administration on Mar. 30, 2023 and Chinese Patent Application Serial No. 202320684431.9 filed to China National Intellectual Property Administration on Mar. 30, 2023, which are incorporated by reference in the present application with its entirety.

TECHNICAL FIELD

The present application relates to the field of a battery including a bracket that prevents wire harnesses from falling off, and particularly to a bracket and a cell contact system (CCS) assembly.

BACKGROUND

Currently, most of collecting wire harnesses of a cell contact system (CCS) fix wire harnesses with ties, and some of the collecting wire harnesses of the CCS fix the wire harnesses with wire harness grooves defined in plastic brackets of the CCS. These two fixing methods have following defects.

1. Using ties to fix the wire harnesses increases production processes, reduces production efficiency, and relatively increases labor costs, which is not conducive to high-efficiency production of industrialization.

2. Using the wire harness grooves to fix the wire harnesses increases complexity of structures of the plastic brackets of the CCS, and increases difficulty of making mold. Materials required for the plastic brackets of the CCS are increased. Weights and costs of the plastic brackets are increased. Defective rates of products are increased under strict conditions of quality control.

SUMMARY

In order to overcome at least one defect described in prior art, the present application provides a bracket and a cell contact system (CCS) assembly. The method of fixing with ties or wire harness grooves is improved. Labor costs are reduced. Mold-making can be produced individually. That the structures such as the wire harness grooves increase production difficulty are improved, thus improving increase in production costs.

In a first aspect, an embodiment of the present application provides a bracket, the bracket includes a bracket body, an elastic member and a position-limiting member. A fixed end of the elastic member is assembled on the bracket body. A fixed end of the position-limiting member is assembled on the bracket body. The position-limiting member, the elastic member, and the bracket body enclose and define a position-limiting space. An end of the elastic member away from the fixed end of the elastic member is a free end. An end of the position-limiting member away from the fixed end of the position-limiting member is a position-limiting end. A guiding opening is defined between the free end of the elastic member and the position-limiting end of the position-limiting member, and is communicated with the position-limiting space. The guiding opening has a size being adjusted by changing a degree of deformation of the free end of the elastic member.

By adopting solutions mentioned above, passage and an effect of fixation and anti-falling off of wire harnesses are achieved by elastic deformation of the elastic member itself.

In a second aspect, an embodiment of the present application provides a cell contact system assembly including a cell contact system body and at least one bracket mentioned above. The bracket is disposed on the cell contact system body, and the position-limiting member and the elastic member are assembled in a groove channel of the bracket body.

By adopting solutions mentioned above, the wire harnesses of the CCS assembly can be fixed. An effect of fixing is good, and the wire harnesses are not easy to fall off.

In summary, the bracket provided in the embodiment of the present application has following technical effects.

1. The elastic member, the position-limiting member, and the bracket body enclose and define the position-limiting space. The position-limiting space can accommodate single wire harness or a plurality of wire harnesses, so that a fixing effect of the wire harnesses can be realized. Overall structure of the bracket is simple, mold-making can be produced individually, and production efficiency is high.

2. The elastic member is limited by the position-limiting member, which prevents the elastic member from being damaged or broken due to excessive force in a case that the elastic member is elastically deformed towards the direction away from the position-limiting space. Meanwhile, the guiding opening can be closed to prevent the wire harnesses from falling off the position-limiting space.

3. The elastic member and the position-limiting member are convenient to be assembled. There is no need to increase labor budgets. Labor costs can be saved in comparison with a fixing manner with the ties.

Figure 1:
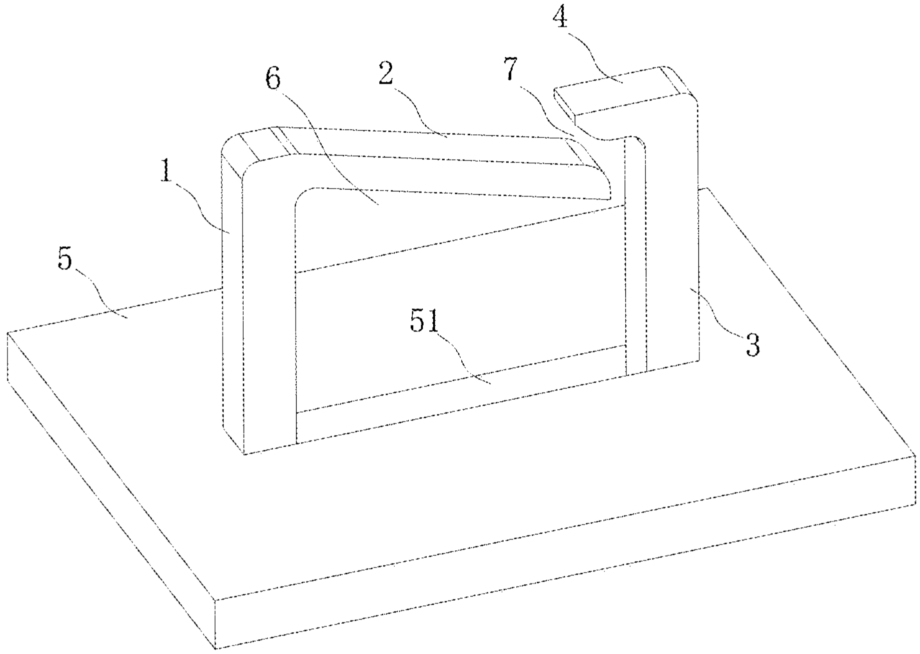
FIG. 1 is a three-dimensional structural schematic diagram of a snap-fit in an embodiment 1 of the present application.

Herein, meanings of reference labels are as follows: 1, elastic plate post; 11, first chamfer; 12, second chamfer; 13, third chamfer; 2, elastic plate; 21, eighth chamfer; 3, position-limiting head post; 31, sixth chamfer; 32, seventh chamfer; 4, position-limiting head; 41, fourth chamfer; 42, fifth chamfer; 43, first portion; 44, second portion; 5, bracket body; 51, groove channel; 6, position-limiting space; 7, guiding opening; 8, elastic member; 9, position-limiting member; 10, bracket; 100, CCS assembly; 1001, CCS body; and 1002, wire harness.

DETAILED DESCRIPTION OF THE EMBODIMENT

In the description of the present application, it should be noted that the terms indicating orientation or location relationships such as “up”, “down”, “left”, “right”, “vertical”, “horizontal”, “top”, “bottom”, “inside”, and “outside” etc. are based on orientation or location relationships shown in drawings, which are only for a convenience of description and simplified operation, rather than indicating or implying that devices or elements referred to must have a specific orientation, be constructed and operated in a specific orientation, so it cannot be understood as a limitation of the present disclosure.

Unless otherwise defined, all technical and scientific terms used herein have the same meaning as commonly understood by one of ordinary skill in the technical field of the present application. Terms used herein in the specification of the present application are only for the purpose of describing specific embodiments only and are not intended to limit the present application.

The present application is shown in FIGS. 1 to 4, and the present application discloses a bracket including an elastic member 8 and a position-limiting member 9. The elastic member 8 and the position-limiting member 9 are both strip-shaped or plate-shaped. The elastic member 8 itself is elastically deformable or partly elastically deformable. The elastic member 8 has a fixed end, the fixed end of the elastic member 8 is assembled on the bracket body 5. The position-limiting member 9 also has a fixed end, the fixed end of the position-limiting member 9 is assembled on the bracket body 5. The position-limiting member 9, the elastic member 8, and the bracket body 5 enclose and define a position-limiting space 6 configured to accommodate wire harnesses. An end of the elastic member 8 away from the fixed end of the elastic member is a free end. An end of the position-limiting member 9 away from the fixed end of the position-limiting member is a position-limiting end. A guiding opening 7 is defined between the free end of the elastic member 8 and the position-limiting end of the position-limiting member 9, and the guiding opening 7 is communicated with the position-limiting space 6. The guiding opening 7 has a size being adjusted by changing a degree of deformation of the free end of the elastic member 8.

The free end of the elastic member 8 can abut against the position-limiting end of the position-limiting member 9 in a case that the free end of the elastic member 8 is elastically deformed towards a direction away from the position-limiting space 6. Thus, an effect of closing the guiding opening 7 can be achieved in a case that there are too many wire harnesses in the position-limiting space 6, so as to achieve an effect of preventing the wire harnesses from falling off. The elastic member 8 and/or the position-limiting member 9 is provided with at least one bending portion, so that the elastic member 8 and the position-limiting member 9 are bent towards each other to define the guiding opening 7. The bending portion can be designed according to different structures of bracket bodies 5. Thus, the elastic member 8 and the position-limiting member 9 can define the position-limiting space, it is beneficial to form the guiding opening 7, and an effect of fixing the wire harnesses can be achieved.

The guiding opening 7 has a width less than a diameter of the wire harness. The size of the guiding opening 7 is adjusted by changing the degree of deformation of the elastic member 8, so as to achieve passage and fixation of the wire harnesses. In a case that the wire harnesses pass through the guide opening 7 and enter into the position-limiting space 6, the free end of the elastic member 8 is elastically deforms toward inside of the position-limiting space 6. In this situation, the guiding opening 7 becomes larger, so as to realize the passage of the wire harnesses. In a case that the elastic member 8 is squeezed by the wire harnesses in the position-limiting space 6, the free end of the elastic member 8 is elastically deformed toward a direction away from the position-limiting space 6. In this situation, the guiding opening 7 becomes smaller, the free end of the elastic member 8 abuts against a position-limiting end of the position-limiting member 9 to achieve anti-falling off of the wire harnesses. Thus, passage and fixation of the wire harnesses can be achieved by elastic deformation of the elastic member 8 itself.

An embodiment 1 of the present application is shown in FIGS. 1 to 4. The elastic member 8 includes an elastic plate post 1 and an elastic plate 2, and the elastic plate 2 and the elastic plate post 1 are integrally formed by bending. The position-limiting member 9 includes a position-limiting head post 3 and a position-limiting head 4, and the position-limiting head post 3 and the position-limiting head 4 are integrally formed by bending. The elastic plate 2 and the position-limiting head 4 are bent towards each other. An end of the elastic plate post 1 away from the elastic plate 2 and an end of the position-limiting head post 3 away from the position-limiting head 4 are both assembled on the bracket body 5. The elastic plate post 1 is a fixed end of the elastic plate 2. The guiding opening 7 is defined between a free end of the elastic plate 2 and a position-limiting end of the position-limiting head 4. Projections of the free end of the elastic plate 2 and the position-limiting end of the position-limiting head 4 on the bracket body 5 at least partially overlap with each other, so that the elastic member 8 and the position-limiting member 9 are bend towards each other. Thus, the wire harnesses enter into the position-limiting space 6 from the guiding opening 7 of the bracket body 5, which is convenient for persons or equipments to operate the wire harnesses. A snap-fit structure with good effect of anti-falling off for the wire harness is achieved.

It should be noted, that the position-limiting head post 3 and the elastic plate post 1 are vertically assembled on the bracket body 5, which is only a preferred embodiment, so as to provide better supporting force for the elastic plate 2 and the position-limiting head 4. In other embodiments, the elastic plate post 1 and the position-limiting head post 3 may not be vertically assembled on the bracket body 5, and may be slightly tilted, as long as self-stability is satisfied. The position-limiting head post 3 and the elastic plate post 1 may also be provided with a structure of a trapezoidal frustum, so as to improve aesthetics and practicality, and further improve stability of fixing the wire harnesses.

Figure 3:
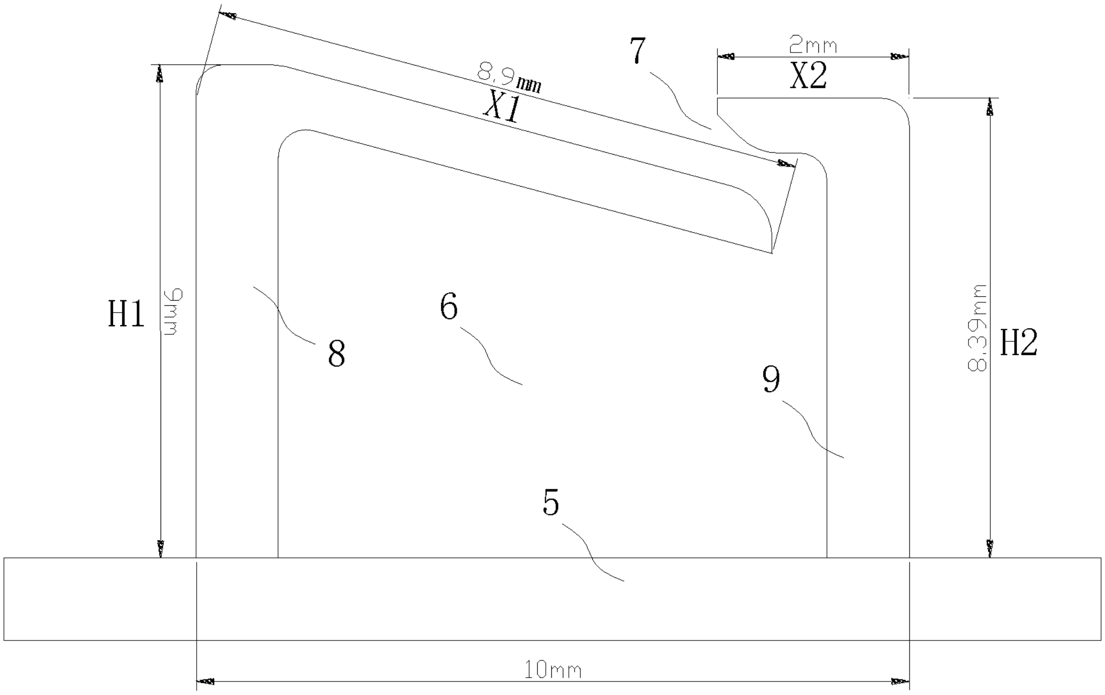
FIG. 3 is a schematic diagram of the snap-fit in the embodiment 1 of the present application in a longitudinal reference plane with a dimension annotation.
Figure 4:
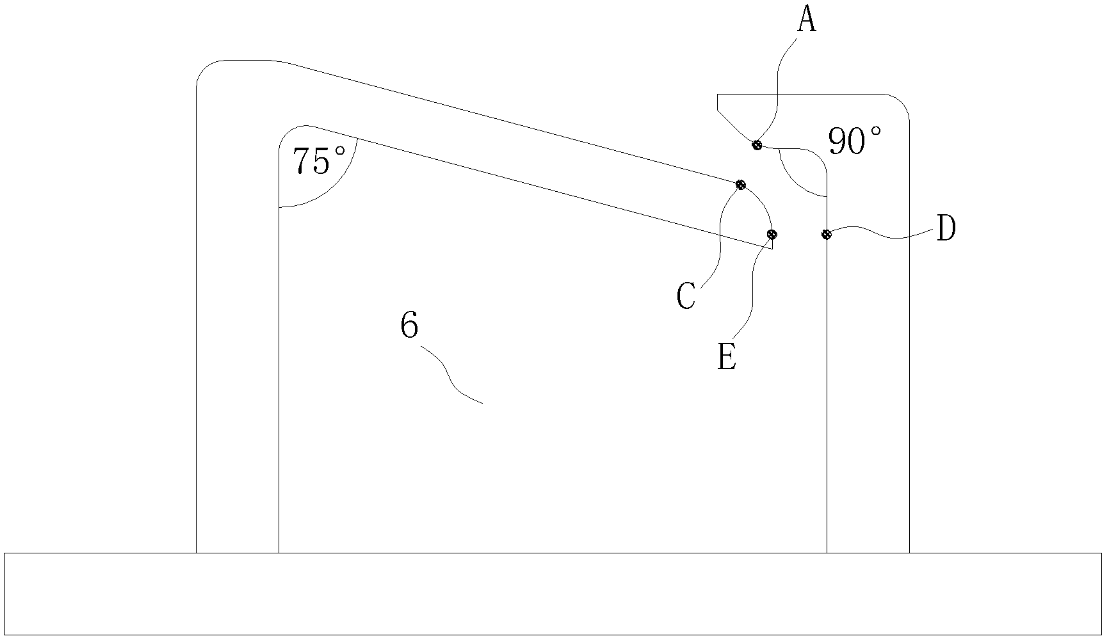
FIG. 4 is a structural schematic diagram of the snap-fit in the embodiment 1 of the present application in the longitudinal reference plane.

In the embodiment 1, referring to FIGS. 3 to 4. A bending side angle between the elastic plate post 1 and the elastic plate 2 is less than a bending side angle between the position-limiting head post 3 and the position-limiting head 4. Thus, the guiding opening of which the size is adjustable is defined between the elastic plate 2 and the position-limiting head 4, and it is beneficial to improve an elastic reset effect of the elastic plate 2. Based on a horizontal reference plane taken by the bracket body 5, the elastic plate post 1 has a height H1, the position-limiting head post 3 has a height H2, and H1>H2. The elastic plate post 1 is higher than the position-limiting head post 3. An angle between the elastic plate 2 and the elastic plate post 1 is set to be less than 90°, so that the elastic plate 2 has a stronger reset effect in a case that the elastic plate rotates itself. Based on the horizontal reference plane taken by the bracket body 5, there is only one longitudinal reference plane passing through the position-limiting member 9 and the elastic member 8. The elastic plate 2 has a length X1 in the only one longitudinal reference plane. The position-limiting head 4 has a length X2 in the only one longitudinal reference plane, and X1>X2. Since the length of the position-limiting head 4 is less than that of the elastic plate 2, stability of the position-limiting head 4 is stronger than that of the elastic plate 2, which helps to limit the position of the elastic plate 2. In the longitudinal reference plane, the position-limiting head post 3, the elastic plate post 1, the elastic plate 2, and the position-limiting head 4 have a relation as follows, H1>X>H2>Y, which is helpful to realize a snap-fit structure that is relatively stable. The snap-fit structure has a function of clamping and is effective for anti-falling off.

Referring to FIG. 4, in the only one longitudinal reference plane, the elastic plate 2 includes a point C that is adjacent to the guiding opening 7 and is closest to a point A of the position-limiting head 4. The elastic plate 2 further includes a point E that is adjacent to the guiding opening 7 and is closest to a point D of the position-limiting head post 3. A distance between the point A and the point C is less than a preset value. A distance between the point D and the point E is less than a preset value. In a case that the wire harnesses are entering into the position-limiting space 6, the wire harnesses can enter from spaces between the point A and the point C, and between the point D and the point E by increasing the guiding opening 7. After the wire harnesses enter into the position-limiting space 6, the guiding opening 7 is rested, which is beneficial to prevent the wire harnesses from slipping out. The preset value is the diameter of the wire harness, and the size of the guiding opening is adaptively adjusted according to the diameter of the wire harness.

Specifically, the length, the width, and the height of the elastic plate post 1 are 1.5 mm×1.5 mm×9 mm. The length, the width, and the height of the position-limiting head post 3 are 1.5 mm×1.5 mm×8.39 mm. The length, the width, and the height of the elastic plate 2 are 1 mm×1.5 mm×8.9 mm. The length, the width, and the height of the position-limiting head 4 are 1 mm×1.5 mm×2 mm. The bracket body 5 is provided with a groove channel 51. The length, the width, and the height of the groove channel 51 are 1.5 mm×10 mm×1.5 mm. Thus, depths of the elastic plate post 1 and the position-limiting head post 3 inserting into the channel 51 is 1.5 mm.

A bending side angle between the elastic plate post 1 and the elastic plate 2 is less than a bending side angle between the position-limiting head post 3 and the position-limiting head 4. Thus, the elastic plate 2 is limited between the position-limiting head 4 and the bracket body 5, which helps to improve a problem of breaking of the elastic plate 2 caused by excessive rotation of the elastic plate 2. In the embodiment 1, the bending side angle between the elastic plate post 1 and the elastic plate 2 is set to be 75°, and the bending side angle between the position-limiting head post 3 and the position-limiting head 4 is set to be 90°. Thus, Stabilities of the position-limiting head post 3 and the position-limiting head 4 are higher, and elasticity of the elastic plate 2 is better. In other embodiments, the bending angle can be slightly changed according to actual situation, which is not specifically limited in the embodiment.

During operation, the elastic plate 2 can be pressed by hand to make the wire harnesses slide into the position-limiting space 6 from the guiding opening 7; or, the elastic plate 2 is directly squeezed downward by the wire harness, and the elastic plate 2 rotates towards a direction away from the position-limiting head 4 under force. The distance between the point A and the point C and the distance between the point D and the point E increase, and the wire harness easily enters into the position-limiting space 6. After the wire harness slides into the position-limiting space 6 or a pressure from the hand on the elastic plate 2 is removed, the elastic plate 2 automatically resets towards the direction adjacent to the position-limiting head 4. In a case that the wire harness shakes to provide the elastic plate 2 with a force to rotate towards a direction of the position-limiting head 4, the distance between the point A and the point C and the distance between the point D and the point E decrease. The distance between the point A and the point C can even become 0, that is, the elastic plate 2 and the position-limiting head 4 contact with each other. The wire harness is even more impossible to fall off, so as to achieve an effect of anti-falling off.

Figure 2:
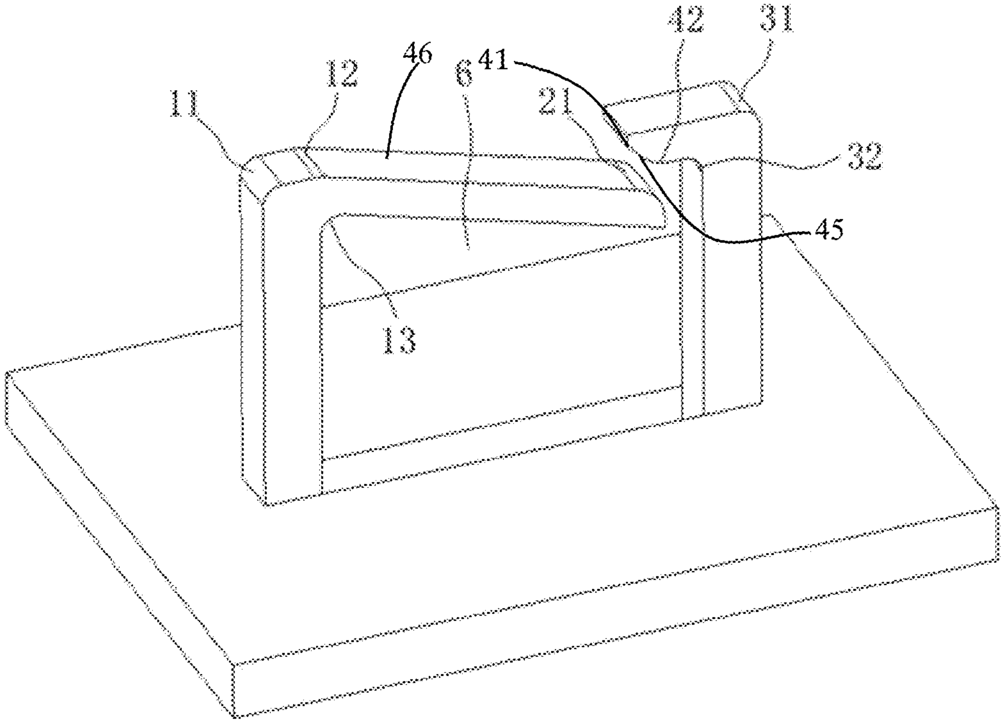
FIG. 2 is a structural schematic diagram of chamfers of the snap-fit in the embodiment 1 of the present application.

Referring to FIG. 2, back bending sides of the elastic plate post 1 and the elastic plate 2 are provided with a first chamfer 11 and a second chamfer 12, respectively. A distance between the first chamfer 11 and the position-limiting head 4 is greater than a distance between the second chamfer 12 and the position-limiting head 4. A chamfer radius of the first chamfer 11 is less than a chamfer radius of the second chamfer 12. Thus, the back bending sides of the elastic plate post 1 and the elastic plate 2 are provided with effects of smooth transition. A bending side between the elastic plate post 1 and the elastic plate 2 is provided with a third chamfer 13, a chamfer radius of the third chamfer 13 is the same as the chamfer radius of the first chamfer 11. Thus, the bending side between the elastic plate post 1 and the elastic plate 2 is provided with a smooth transition, thereby preventing the wire harnesses from excessive wear. A side of the position-limiting head 4 adjacent to the guiding opening 7 is provided with a fourth chamfer 41, a first flat surface 45 and a fifth chamfer 42. The first flat surface 45 is between the fourth chamfer 41 and the fifth chamfer 42. A distance between the fourth chamfer 41 and the elastic plate post 1 is less than a distance between the fifth chamfer 42 and the elastic plate post 1. A chamfer radius of the fourth chamfer 41 and a chamfer radius of the fifth chamfer 42 are both the same as the chamfer radius of the second chamfer 12. In the case that the wire harnesses are entering from the guiding opening 7, wear for the wire harnesses caused by an edge of the position-limiting head 4 is prevented. A back bending side between the position-limiting head post 3 and the position-limiting head 4 is provided with a sixth chamfer 31. A bending side between the position-limiting head post 3 and the position-limiting head 4 is provided with a seventh chamfer 32. A chamfer radius of the sixth chamfer 31 and a chamfer radius of the seventh chamfer 32 are the same as the chamfer radius of the first chamfer 11. A smooth transition of the back bending side between the position-limiting head post 3 and the position-limiting head 4 is realized. The bending side between the position-limiting head post 3 and the position-limiting head 4 is provided with a chamfer, thereby preventing the wire harnesses disposed inside from excessive wear. A side of the elastic plate 2 adjacent to the position-limiting head 4 is provided with a eighth chamfer 21, and a chamfer radius of the eighth chamfer 21 is the same as the chamfer radius of the second chamfer 12. The elastic plate 2 is further provided with a second flat surface 46 between the second chamfer 12 and the eighth chamfer 21. The fourth chamfer 41 is adjacently connected with the fifth chamfer 42 via the first flat surface 45, and the first flat surface 45 and the second flat surface 46 are extended inclinedly downward at an acute angle therebetween. In the case that the wire harnesses enter from the guiding opening 7, wear for the wire harnesses caused by an edge of the elastic plate 2 is prevented.

Specifically, chamfering radiuses of the first chamfer 11, the third chamfer 13, the sixth chamfer 31, and the seventh chamfer 32 are set to be 0.5 mm. Chamfering radiuses of the second chamfer 12, the fourth chamfer 41, the fifth chamfer 42, and the eighth chamfer 21 are set to be 1 mm. The first chamfer 11 and the sixth chamfer 31 are set to be same, so that bending angles of both are same and are 90°. Meanwhile, the elastic plate 2 is further bent towards the position-limiting space 6, the second chamfer 12 is added, and a bending angle of the second chamfer 12 is less than 90°. Therefore, the elastic plate 2 is lower than the position-limiting head 4 after being bent for a second time. The fourth chamfer 41, the fifth chamfer 42, and the eighth chamfer 21 help to improve surface smoothness, and improve fluency of entry of the wire harnesses. In other embodiments, chamfering radiuses may vary according to an actual bending angle of the position-limiting head post 3 and the elastic plate post 1, which is not specifically limited in the embodiment.

Figure 5:
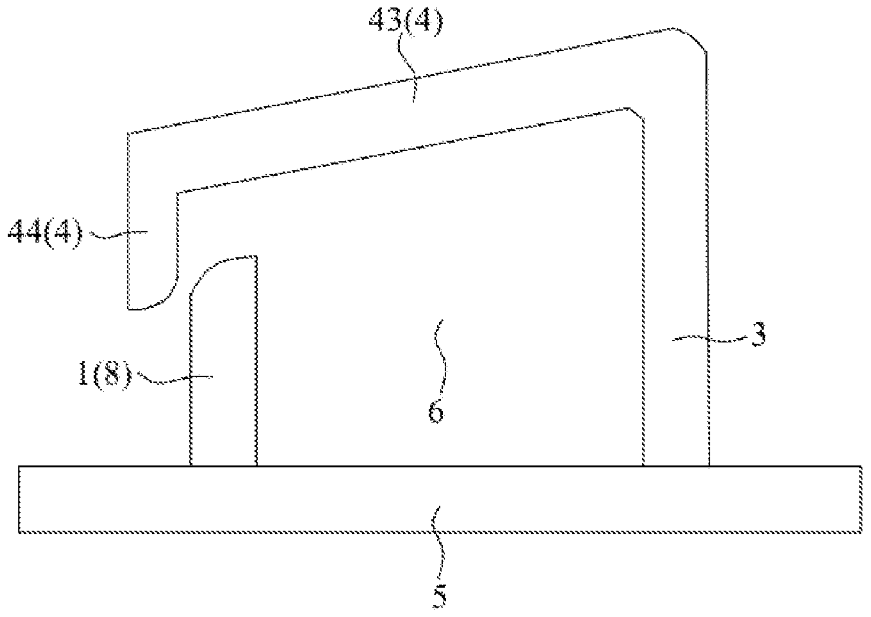
FIG. 5 is a structural schematic diagram of a snap-fit in an embodiment 2 of the present application.

In an embodiment 2 of the present application, please refer to FIG. 5, the position-limiting member 9 includes a position-limiting head post 3 and a position-limiting head 4. The position-limiting head post 3 and the position-limiting head 4 are integrally formed by bending. The position-limiting head 4 is bent towards a direction of the elastic member 8 to form a position-limiting end. The guiding opening 7 is defined between the free end of the elastic member 8 and the position-limiting end of the position-limiting head 4. An end of the position-limiting head post 3 away from the position-limiting head 4 is assembled on the bracket body 5. The elastic member 8 is directly assembled on the bracket body 5. Thus, the position-limiting member 9 is bent towards the direction of the elastic member 8, the elastic member 8 is directly assembled on the bracket body 5. The wire harnesses enter the position-limiting space 6 from a side of the bracket body 5 adjacent to the elastic member 8. A structure of the guiding opening 7 at one side can be formed, stability is improved, and effects of clamping and anti-falling off for the wire harnesses can be satisfied.

In a case that the position-limiting head post 3 and the elastic member 8 are both vertically assembled on the bracket body 5, the height of the position-limiting head post 3 is greater than the height of the elastic member 8, and the angle between the position-limiting head 4 and the position-limiting head post 3 is less than 90°. Thus, the position-limiting space 6 is in a shape of a right-angled trapezoid, the length of the position-limiting head 4 is greater than an assembly distance between the elastic member 8 and the position-limiting head post 3. A position-limiting end of the position-limiting head 4 is lower than the free end of the elastic member 8, so as to limit the elastic member 8, and prevent the elastic member 8 from elastically deforming towards the direction away from the position-limiting space 6 so that the guiding opening 7 becomes larger, thereby preventing the wiring harness falling off from the position-limiting space 6. In the embodiment 2, for example, as shown in FIG. 5, the elastic member 8 may be the elastic plate post 1 in the embodiment 1, and the position-limiting head 4 may include a first portion 43 and a second portion 44 connected to each other. The first portion 43 is connected to the position-limiting head post 3 and extends towards the elastic member 8. The angle between the first portion 43 and the position-limiting head post 3 is less than 90°. The first portion 43 has a length that is greater than the assembly distance between the elastic member 8 and the position-limiting head post 3. The second portion 44 includes the position-limiting end and is bent towards the elastic member 8. The second portion 44 is disposed at a side of the elastic member 8 away from the position-limiting head post 3. The first portion 43 and the second portion 44 are integrally formed by bending. The guiding opening 7 is defined between the free end of the elastic member 8 and the position-limiting end of the second portion 44.

In other embodiments, the elastic member 8 may not be vertically assembled on the bracket body 5, and in this situation, the position-limiting head post 3 is not vertically assembled in the bracket body 5 either. There is one bending between the position-limiting head post 3 and the position-limiting head 4, so that a structure of the position-limiting space 6 is in a shape of triangle of which an angle and a side length are not specifically limited. It is only necessary for the position-limiting end of the position-limiting head 4 to be lower than the free end of the elastic member 8, thereby preventing the wire harnesses from falling off from the position-limiting space 6.

In other embodiments, the position-limiting space 6 enclosed by the elastic member 8, the position-limiting member 9 and the bracket body 5 can also be in a shape of a polygon, a circle or an ellipse, so as to satisfy an effect of anti-falling off of the guiding opening 7.

Figure 6A:
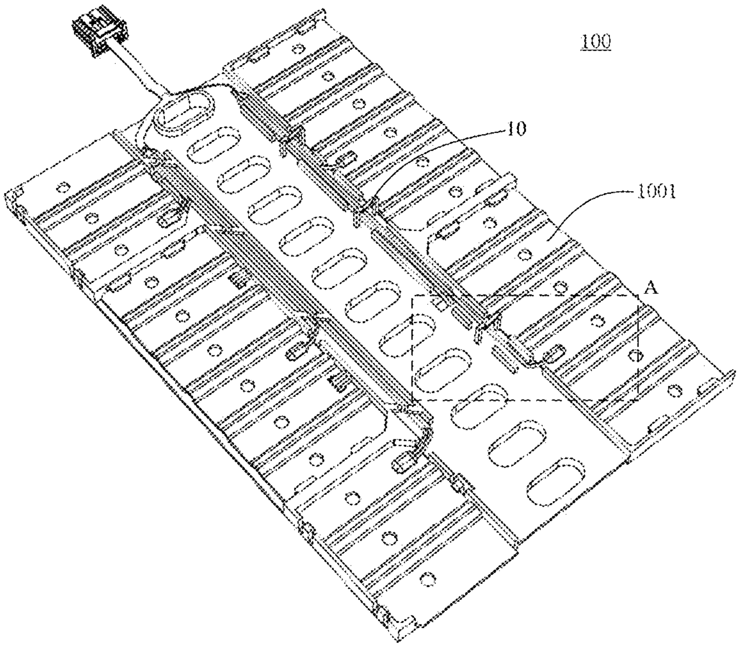
FIG. 6A is a structural schematic diagram of a CCS assembly according to embodiments of the present application.
Figure 6B:
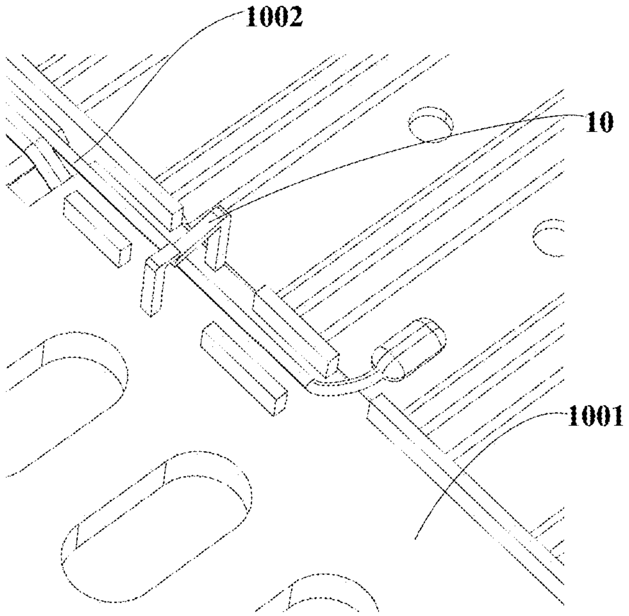
FIG. 6B is a partial enlarged view at detail A in FIG. 6A.

The present application further provides a cell contact system (CCS) assembly 100 including a CCS body 1001 and at least one bracket 10, as shown in FIGS. 6A and 6B. The bracket 10 is disposed on the CCS body 1001. The bracket body 5 is provided with a groove channel 51 in which the elastic member 8 and the position-limiting member 9 are assembled. The wire harnesses 1002 of the CCS assembly can be fixed with one or more bracket 10, so as to improve it that the wire harness grooves are directly defined in the bracket 10 of the CCS assembly. Complexity of plastic bracket structures of the CCS assembly is reduced. Efficiency of mold-opening is improved, materials of plastic brackets of the CCS assembly is reduced, and weight of the CCS assembly is reduced. An assembling between anti-falling off structures for the wire harnesses and the CCS assembly is easy, and an effect of anti-falling off for the wire harnesses can be achieved. Therefore, there is no need to use straps, a problem of slow production efficiency caused by human participation is improved, and at the same time, labor costs are saved.

In summary, the bracket and the cell contact system provided in the embodiment of the present application have following technical effects.

1. The elastic member 8, the position-limiting member 9, and the bracket body 5 enclose and define the position-limiting space 6. The position-limiting space can accommodate single wire harness or a plurality of wire harnesses, so that fixing effect of the wire harnesses can be realized. Overall structure of the bracket is simple, mold-making can be produced individually, and production efficiency is high.

2. The elastic member 8 is limited by the position-limiting member 9, which prevents the elastic member 8 from being damaged or broken due to excessive force in a case that the elastic member 8 is elastically deformed towards the direction away from the position-limiting space 6.

3. The elastic member 8 and the position-limiting member 9 are convenient to be assembled. There is no need to increase labor budgets. Labor costs can be saved in comparison with a fixing manner with the ties.

4. Anti-falling off structures for the wire harnesses are assembled on the bracket of the CCS, so that the wire harness grooves directly defined in the bracket of the CCS is improved. Complexity of plastic bracket of the CCS structure is reduced. Efficiency of mold-opening is improved, materials of plastic support of the CCS is reduced, and weight of the CCS is reduced.

5. After the snap-fit structure are assembled, the elastic plate 2 and the position-limiting head 4 of the snap-fit structure can achieve an effect of anti-falling off for the wire harnesses. There is no need to use straps, a problem of slow production efficiency caused by human participation is improved, and at the same time, labor costs are saved.

6. The wire harness can slide in smoothly from the guiding opening 7 by elastic deformation of the elastic member 8 itself. The elastic member 8 is limited by the position-limiting member 9, so that the elastic plate 2 is prevented from being squeezed by the wire harness to be open, so as to realize the effect of anti-falling off.

What is claimed is:

1. A bracket, characterized by comprising:

a bracket body;

an elastic member, wherein a fixed end of the elastic member is assembled on the bracket body; and a position-limiting member, wherein a fixed end of the position-limiting member is assembled on the bracket body;

wherein the position-limiting member, the elastic member, and the bracket body enclose and define a position-limiting space; an end of the elastic member away from the fixed end of the elastic member is a free end; an end of the position-limiting member away from the fixed end of the position-limiting member is a position-limiting end; and a guiding opening is defined between the free end of the elastic member and the position-limiting end of the position-limiting member, and the guiding opening is communicated with the position-limiting space; and wherein the guiding opening has a size being adjusted by changing a degree of deformation of the free end of the elastic member;

wherein the elastic member comprises an elastic plate post and an elastic plate, and the elastic plate and the elastic plate post are integrally formed by bending; the position-limiting member comprises a position-limiting head post and a position-limiting head, the position-limiting head post and the position-limiting head are integrally formed by bending; the elastic plate and the position-limiting head are bent towards each other; back bending sides of the elastic plate post and the elastic plate are provided with a first chamfer and a second chamfer, respectively;

a side of the position-limiting head adjacent to the guiding opening is provided with a fourth chamfer, a first flat surface and a fifth chamfer; the first flat surface is between the fourth chamfer and the fifth chamfer; and a chamfer radius of the fourth chamfer and a chamfer radius of the fifth chamfer are both the same as a chamfer radius of the second chamfer;

a side of the elastic plate adjacent to the position-limiting head is provided with a eighth chamfer, and a chamfer radius of the eighth chamfer is the same as the chamfer radius of the second chamfer; the elastic plate is further provided with a second flat surface between the second chamfer and the eighth chamfer;

wherein the fourth chamfer is adjacently connected with the fifth chamfer via the first flat surface, the first flat surface and the second flat surface are extended inclinedly downward, and in only one longitudinal reference plane passing through the position-limiting member and the elastic member, an extension line of the first flat surface and an extension line of the second flat surface are intersected between the position-limiting head post and the eighth chamfer.

2. The bracket of claim 1, wherein the size of the guiding opening gradually increases in a case that the free end of the elastic member is elastically deformed towards a direction to the position-limiting space; and the size of the guiding opening gradually decreases in a case that the free end of the elastic member is elastically deformed towards a direction away from the position-limiting space.

3. The bracket of claim 2, wherein the free end of the elastic member abuts against the position-limiting end of the position-limiting member in the case that the free end of the elastic member is elastically deformed towards the direction away from the position-limiting space.

4. The bracket of claim 1, wherein the elastic member and/or the position-limiting member is provided with at least one bending portion, so that the elastic member and the position-limiting member are bent towards each other to define the guiding opening.

5. The bracket of claim 4, wherein an end of the elastic plate post away from the elastic plate and an end of the position-limiting head post away from the position-limiting head are both assembled on the bracket body, and the elastic plate post is at a fixed end of the elastic plate; and wherein the guiding opening is defined between a free end of the elastic plate and a position-limiting end of the position-limiting head, and projections of the free end of the clastic plate and the position-limiting end of the position-limiting head on the bracket body at least partially overlap with each other.

6. The bracket of claim 5, wherein a bending side angle between the elastic plate post and the elastic plate is less than a bending side angle between the position-limiting head post and the position-limiting head.

7. The bracket of claim 5, wherein based on a horizontal reference plane taken by the bracket body, the elastic plate post has a height H1, the position-limiting head post has a height H2, and H1>H2.

8. The bracket of claim 5, wherein based on a horizontal reference plane taken by the bracket body, there is the only one longitudinal reference plane passing through the position-limiting member and the elastic member; the elastic plate has a length X1 in the only one longitudinal reference plane; the position-limiting head has a length X2 in the only one longitudinal reference plane, and X1 >X2.

9. The bracket of claim 8, wherein in the only one longitudinal reference plane, the elastic plate comprises a point C that is adjacent to the guiding opening and is closest to a point A of the position-limiting head, the elastic plate further comprises a point E that is adjacent to the guiding opening and is closest to a point D of the position-limiting head post; a distance between the point A and the point C is less than a preset value, and a distance between the point D and the point E is less than a preset value.

10. The bracket of claim 4, wherein the position-limiting head is bent towards a direction of the elastic member to form a position-limiting end; the guiding opening is defined between the free end of the elastic member and the position-limiting end of the position-limiting head; and an end of the position-limiting head post away from the position-limiting head is assembled on the bracket body.

11. The bracket of claim 1, wherein a distance between the first chamfer and the position-limiting head is greater than a distance between the second chamfer and the position-limiting head; and a chamfer radius of the first chamfer is less than a chamfer radius of the second chamfer.

12. The bracket of claim 11, wherein a bending side between the elastic plate post and the elastic plate is provided with a third chamfer, a chamfer radius of the third chamfer is the same as the chamfer radius of the first chamfer.

13. The bracket of claim 11, wherein a distance between the fourth chamfer and the elastic plate post is less than a distance between the fifth chamfer and the elastic plate post.

14. The bracket of claim 11, wherein a back bending side between the position-limiting head post and the position-limiting head is provided with a sixth chamfer; a bending side between the position-limiting head post and the position-limiting head is provided with a seventh chamfer; and a chamfer radius of the sixth chamfer and a chamfer radius of the seventh chamfer are the same as the chamfer radius of the first chamfer.

15. A cell contact system assembly, comprising a cell contact system body and at least one bracket, the at least one bracket comprising:

a bracket body;

an elastic member, wherein a fixed end of the elastic member is assembled on the bracket body; and a position-limiting member, wherein a fixed end of the position-limiting member is assembled on the bracket body;

wherein the position-limiting member, the elastic member, and the bracket body enclose and define a position-limiting space; an end of the elastic member away from the fixed end of the elastic member is a free end; an end of the position-limiting member away from the fixed end of the position-limiting member is a position-limiting end; and a guiding opening is defined between the free end of the elastic member and the position-limiting end of the position-limiting member, and the guiding opening is communicated with the position-limiting space;

wherein the guiding opening has a size being adjusted by changing a degree of deformation of the free end of the elastic member; and wherein the elastic member comprises an elastic plate post and an elastic plate, and the elastic plate and the elastic plate post are integrally formed by bending; the position-limiting member comprises a position-limiting head post and a position-limiting head, the position-limiting head post and the position-limiting head are integrally formed by bending; the elastic plate and the position-limiting head are bent towards each other; back bending sides of the elastic plate post and the elastic plate are provided with a first chamfer and a second chamfer, respectively;

a side of the position-limiting head adjacent to the guiding opening is provided with a fourth chamfer, a first flat surface and a fifth chamfer; the first flat surface is between the fourth chamfer and the fifth chamfer; and a chamfer radius of the fourth chamfer and a chamfer radius of the fifth chamfer are both the same as a chamfer radius of the second chamfer;

a side of the elastic plate adjacent to the position-limiting head is provided with a eighth chamfer, and a chamfer radius of the eighth chamfer is the same as the chamfer radius of the second chamfer; the elastic plate is further provided with a second flat surface between the second chamfer and the eighth chamfer;

wherein the fourth chamfer is adjacently connected with the fifth chamfer via the first flat surface, and the first flat surface and the second flat surface are extended inclinedly downward, and in only one longitudinal reference plane passing through the position-limiting member and the elastic member, an extension line of the first flat surface and an extension line of the second flat surface are intersected between the position-limiting head post and the eighth chamfer;

wherein the bracket body is disposed on the cell contact system body, and the position-limiting member and the elastic member are assembled in a groove channel of the bracket body.

16. The cell contact system assembly of claim 15, wherein the free end of the clastic member abuts against the position-limiting end of the position-limiting member in a case that the free end of the elastic member is elastically deformed towards a direction away from the position-limiting space.

17. The cell contact system assembly of claim 15, wherein the elastic member and/or the position-limiting member is provided with at least one bending portion, so that the elastic member and the position-limiting member are bent towards each other to define the guiding opening.

18. The cell contact system assembly of claim 17, wherein an end of the elastic plate post away from the elastic plate and an end of the position-limiting head post away from the position-limiting head are both assembled on the bracket body, and the elastic plate post is at a fixed end of the elastic plate; and wherein the guiding opening is defined between a free end of the elastic plate and a position-limiting end of the position-limiting head, and projections of the free end of the elastic plate and the position-limiting end of the position-limiting head on the bracket body at least partially overlap with each other.

19. The cell contact system assembly of claim 15, wherein a distance between the first chamfer and the position-limiting head is greater than a distance between the second chamfer and the position-limiting head; and a chamfer radius of the first chamfer is less than a chamfer radius of the second chamfer.

* * * * *